(12) United States Patent
Brizard (10) Patent No.: US 9,457,879 B2
(45) Date of Patent: Oct. 4, 2016

(54) SELF-BURYING AUTONOMOUS UNDERWATER VEHICLE AND METHOD FOR MARINE SEISMIC SURVEYS

(71) Applicant: CGG SERVICES SA, Massy (FR)

(72) Inventor: Thierry Brizard, Massy (FR)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 298 days.

(21) Appl. No.: 14/103,216

(22) Filed: Dec. 11, 2013

(65) Prior Publication Data

US 2014/0290554 A1   Oct. 2, 2014

Related U.S. Application Data

(60) Provisional application No. 61/737,965, filed on Dec. 17, 2012.

(51) Int. Cl.
| | |
|---|---|
| *B63G 8/00* | (2006.01) |
| *B63H 19/08* | (2006.01) |
| *B63H 11/02* | (2006.01) |

(Continued)

(52) U.S. Cl.
CPC .............. *B63G 8/001* (2013.01); *B63H 11/02* (2013.01); *B63H 19/08* (2013.01); *G01V 1/166* (2013.01); *G01V 1/3852* (2013.01); *B63B 2702/08* (2013.01); *B63B 2702/12* (2013.01); *B63G 2008/004* (2013.01); *G01V 2210/1427* (2013.01)

(58) Field of Classification Search
CPC ..................................... B63B 22/023
USPC ................................. 114/312–342
See application file for complete search history.

(56) References Cited

U.S. PATENT DOCUMENTS

| 3,079,753 A | * | 3/1963 | Gongwer | ............... B63H 11/12 60/227 |
| 3,685,608 A | | 8/1972 | Hamilton | |
| 4,095,550 A | | 6/1978 | Kerr | |

(Continued)

FOREIGN PATENT DOCUMENTS

| CN | 102213594 | 10/2011 |
| EP | 1217390 | 6/2002 |

(Continued)

OTHER PUBLICATIONS

International Search Report mailed Feb. 20, 2014, in related international Application No. PCT/EP2013/074409.

(Continued)

*Primary Examiner* — Luke Ratcliffe
(74) *Attorney, Agent, or Firm* — Park, Vaughan, Fleming & Dowler LLP; Shane A. Nelson (57) ABSTRACT

An autonomous underwater vehicle (AUV) for recording seismic signals during a marine seismic survey. The AUV includes a body having a base and sides; a propulsion system for guiding the AUV to a final target on the ocean bottom; a pump-jet connected to an inlet and plural base outlets, wherein the plural base outlets are distributed on the base; a processor connected to the pump-jet and configured to activate the pump-jet when the base in on the ocean bottom; and a seismic sensor configured to record seismic signals. The pump-jet has a first low speed so that water jets expelled at the plural base outlets fluidize the ocean bottom underneath the base and buries the AUV.

20 Claims, 11 Drawing Sheets

(51) Int. Cl.
*G01V 1/16* (2006.01)
*G01V 1/38* (2006.01)

(56) References Cited

U.S. PATENT DOCUMENTS

| | | | |
|---|---|---|---|
| 5,243,565 A * | 9/1993 | Yamamoto | G01S 3/802 367/124 |
| 5,253,605 A | 10/1993 | Collins | |
| 5,758,592 A * | 6/1998 | Benson, Jr. | B63G 8/16 114/151 |
| 5,894,450 A * | 4/1999 | Schmidt | H04B 13/02 367/131 |
| 6,044,745 A | 4/2000 | Hickey | |
| 6,371,003 B1 * | 4/2002 | Hickey | B63B 21/27 102/411 |
| 6,390,012 B1 | 5/2002 | Watt et al. | |
| 6,474,254 B1 * | 11/2002 | Ambs | B63B 21/66 114/312 |
| 6,482,054 B2 | 11/2002 | Treaster et al. | |
| 6,625,083 B2 | 9/2003 | Vandenbroucke | |
| 6,779,475 B1 | 8/2004 | Crane et al. | |
| 6,932,185 B2 * | 8/2005 | Bary | G01V 1/38 181/110 |
| 6,951,138 B1 * | 10/2005 | Jones | G01V 1/3852 367/159 |
| 7,016,260 B2 | 3/2006 | Bary | |
| 7,037,150 B2 * | 5/2006 | Morvillo | B63H 11/11 114/151 |
| 7,124,698 B1 | 10/2006 | Shen et al. | |
| 7,148,416 B1 | 12/2006 | Rice | |
| 7,224,641 B2 | 5/2007 | Nas | |
| 7,252,046 B1 | 8/2007 | Ead et al. | |
| 7,457,193 B2 * | 11/2008 | Pramik | G01V 1/3861 181/110 |
| 7,496,002 B2 * | 2/2009 | Vosburgh | H04B 13/02 114/312 |
| 7,736,094 B1 | 6/2010 | Bianchi et al. | |
| 7,796,466 B2 | 9/2010 | Combee et al. | |
| 7,965,583 B2 | 6/2011 | Thomas | |
| 8,025,021 B2 | 9/2011 | Gosling | |
| 8,096,254 B1 | 1/2012 | Bauer et al. | |
| 8,109,223 B2 | 2/2012 | Jamieson | |
| 8,570,829 B2 * | 10/2013 | Hovland | G01V 1/3861 114/245 |
| 8,576,658 B2 | 11/2013 | Thomas | |
| 8,677,921 B2 | 3/2014 | Gosling | |
| 8,717,844 B2 | 5/2014 | Welker et al. | |
| 8,881,665 B2 | 11/2014 | Brizard et al. | |
| 8,982,662 B2 | 3/2015 | Rouquette et al. | |
| 9,090,319 B2 | 7/2015 | Brizard et al. | |
| 9,140,814 B2 * | 9/2015 | Welker | G01V 1/3843 |
| 2002/0110048 A1 * | 8/2002 | Vandenbroucke | G01V 1/3852 367/24 |
| 2006/0002230 A1 | 1/2006 | Berg et al. | |
| 2008/0080318 A1 * | 4/2008 | Maxwell | G01V 1/16 367/131 |
| 2008/0144442 A1 * | 6/2008 | Combee | G01V 1/22 367/131 |
| 2008/0225643 A1 * | 9/2008 | Vosburgh | H04B 13/02 367/131 |
| 2009/0238647 A1 * | 9/2009 | Delfino | G01V 1/047 405/172 |
| 2009/0316526 A1 * | 12/2009 | Grall | G01V 1/3826 367/20 |
| 2010/0000459 A1 | 1/2010 | Colangelo | |
| 2010/0153050 A1 * | 6/2010 | Zumberge | G01V 7/16 702/92 |
| 2010/0157727 A1 | 6/2010 | Woodard, Jr. et al. | |
| 2010/0182870 A1 | 7/2010 | Norris et al. | |
| 2010/0302901 A1 * | 12/2010 | Welker | G01V 1/3843 367/21 |
| 2011/0266086 A1 * | 11/2011 | Welker | B63B 27/36 181/122 |
| 2011/0297121 A1 | 12/2011 | Kraus et al. | |
| 2012/0069702 A1 | 3/2012 | Muyzert et al. | |
| 2013/0083622 A1 | 4/2013 | Herrmann et al. | |
| 2013/0083623 A1 | 4/2013 | Brizard et al. | |
| 2013/0083624 A1 * | 4/2013 | Brizard | B63C 11/42 367/15 |
| 2013/0163374 A1 | 6/2013 | Herrmann et al. | |
| 2014/0053768 A1 | 2/2014 | Brizard et al. | |
| 2014/0078861 A1 | 3/2014 | Tamanaja et al. | |
| 2014/0140170 A1 | 5/2014 | Brizard et al. | |
| 2014/0177387 A1 | 6/2014 | Brizard et al. | |
| 2014/0226440 A1 * | 8/2014 | Gosling | B63B 1/04 367/16 |
| 2015/0151819 A1 * | 6/2015 | Tjom | B63G 8/001 114/321 |
| 2015/0177212 A1 * | 6/2015 | Thomas | B63G 8/001 114/331 |
| 2015/0276959 A1 | 10/2015 | Grimsdale et al. | |

FOREIGN PATENT DOCUMENTS

| | | |
|---|---|---|
| EP | 1319964 | 6/2003 |
| GB | 2041301 | 9/1980 |
| GB | 2163114 | 2/1986 |
| WO | 01/73477 | 10/2001 |
| WO | 0173477 | 10/2001 |
| WO | 03/005062 | 1/2003 |
| WO | 2005/010316 | 2/2005 |
| WO | 2007/040411 | 4/2007 |
| WO | 2011/106237 | 9/2011 |
| WO | 2012/013171 | 2/2012 |
| WO | 2012/013962 | 2/2012 |
| WO | 2012085590 | 6/2012 |
| WO | 2013041838 | 3/2013 |
| WO | 2013045669 | 4/2013 |
| WO | 2013076488 | 5/2013 |
| WO | 2013128187 | 9/2013 |
| WO | 2013128188 | 9/2013 |
| WO | 2014096265 | 6/2014 |

OTHER PUBLICATIONS

Written Opinion of the International Searching Authority mailed Feb. 20, 2014, in related International Application No. PCT/EP2013/074409.
International Search Report in corresponding International Application No. PCT/EP2012/069144 mailed Feb. 4, 2013.
Written Opinion in corresponding International Application No. PCT/EP2012/069144 mailed Feb. 4, 2013.
International Search Report in corresponding International Application No. PCT/EP2012/069145 mailed Feb. 6, 2013.
Written Opinion in corresponding International Application PCT/EP2012/069145 mailed Feb. 6, 2013.
D. R. Yoerger, et al.; "Fine-Scale Seafoor Survey in Rugged Deep-Ocean Terrain with an Autonomous Robot"; Proceedings, ICRA, International Conference on Robotics and Automation, San Francisco, CA, Apr. 2000; ISBN 0-7803-5886-4 pp. 1787-1792.
Rhonda Duey; "Flying' Nodes Shift Marine Seismic Paradigm"; Dec. 1, 2011; pp. 1-2; [downloaded on Feb. 28, 2012 http://www.epmag.com/item/print/Flying-Nodes-Shift-Marine-Seismic-Paradigm-92689].
Tadahiro Hyakudome; "Design of Autonomous Underwater Vehicle"; Japan Agency for Marine-Earth Science and Technology (JAMSTEC), Japan; International Journal of Advanced Robotic Systems; vol. 8, No. 1 (2011) ISSN 1729-8806; pp. 122-130; [downloaded from http://www.intechopen.com/journals/international_journal_of_ _advanced_robotic_systems/design-of-autonomous-underwater-vehicle].
Hiroshi Yoshida, et al.; "New Attempts in the MR-X1 Sea-Trials: The Working AUV Tries to Survey of the Sea Floor and to Take Mud Samples"; Paper No. OMAE2010-20347; Proceedings of the ASME 2010 29th International Conference on Ocean, Offshore and Arctic Engineering; Jun. 6-11, 2010; Shanghai, China; [Downloaded From: http://proceedings.asmedigitalcollection.asme.org/ on Nov. 25, 2015].

* cited by examiner

SELF-BURYING AUTONOMOUS UNDERWATER VEHICLE AND METHOD FOR MARINE SEISMIC SURVEYS

BACKGROUND

1. Technical Field

Embodiments of the subject matter disclosed herein generally relate to methods and systems and, more particularly, to mechanisms and techniques for improving a coupling between the ocean bottom and an autonomous underwater vehicle (AUV) that carries seismic sensors for a marine seismic survey.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration to determine the properties of earth's subsurface, which is especially helpful in determining the above-noted reservoirs. Marine reflection seismology is based on using a controlled source of energy that sends the energy into the earth. By measuring the time it takes for the reflections and/or refractions to come back to plural receivers, it is possible to evaluate the depth of features causing such reflections. These features may be associated with subterranean hydrocarbon deposits.

A traditional system for generating the seismic waves and recording their reflections off the geological structures present in the subsurface includes a vessel that tows an array of seismic receivers provided on streamers. The streamers may be disposed horizontally, i.e., lying at a constant depth relative to the ocean surface. The streamers may be disposed to have other than horizontal spatial arrangements. The vessel also tows a seismic source array configured to generate a seismic wave. The seismic wave propagates downward and penetrates the seafloor until eventually a reflecting structure (reflector) reflects the seismic wave. The reflected seismic wave propagates upward until detected by the receiver(s) on the streamer(s). Based on the data collected by the receiver(s), an image of the subsurface is generated.

However, this traditional configuration is expensive because the cost of the streamers is high. New technologies deploy plural seismic sensors on the bottom of the ocean (ocean bottom stations) to improve the coupling. Even so, positioning the seismic sensors remains a challenge.

Other technologies use permanent receivers set on the ocean bottom, as disclosed in U.S. Pat. No. 6,932,185, the entire content of which is incorporated herein by reference. In this case, the seismic sensors are attached to a heavy pedestal. A station that includes the sensors is launched from a vessel and arrives, due to its gravity, at a desired position and remains on the bottom of the ocean permanently. Data recorded by sensors is transferred through a cable to a mobile station. When necessary, the mobile station may be brought to the surface to retrieve the data.

Although this method provides a better coupling between the ocean bottom and the sensors, the method is still expensive and not flexible because the sensors and corresponding pedestals are left on the seafloor. Further, positioning the sensors is not straightforward.

An improved approach to these problems is the use of plural AUVs for carrying the seismic sensors and collecting the seismic data. The AUVs may be launched from a deployment vessel, guided to a final destination on the ocean bottom, instructed to record the seismic data, and then instructed to surface for collecting the seismic data. However, many challenges are posed in the deployment of AUVs for collecting seismic data. One such challenge is the coupling between the ocean bottom and the seismic sensor. The seismic sensor is currently located on the AUV's outer skin or in a chamber inside, so it is possible for the seismic sensor not to come in contact with the ocean bottom. Further, if the ocean bottom is hard, the AUV itself may not have good contact with it. If marine currents are present, the AUV may drift from its intended destination, which degrades the recorded seismic data.

Accordingly, it would be desirable to provide systems and methods that provide an inexpensive and simple way to achieve good coupling between the AUV's seismic sensors and the ocean bottom.

SUMMARY

According to one exemplary embodiment, there is an autonomous underwater vehicle (AUV) for recording seismic signals during a marine seismic survey. The AUV includes a body having a base and sides; a propulsion system for guiding the AUV to a final target on the ocean bottom; a pump-jet connected to an inlet and plural base outlets, wherein the plural base outlets are distributed on the base; a processor connected to the pump-jet and configured to activate the pump-jet when the base is on the ocean bottom; and a seismic sensor configured to record seismic signals. The pump-jet has a first low speed so that water jets expelled at the plural base outlets fluidize the ocean bottom underneath the base and buries the AUV.

According to another exemplary embodiment, there is a marine seismic survey system for generating seismic waves and recording seismic signals. The system includes a source vessel towing a seismic source for generating the seismic waves; and plural autonomous underwater vehicles (AUV) for recording the seismic signals. The AUV may have the structure noted in the paragraph above.

According to yet another exemplary embodiment, there is a method for partially burying an autonomous underwater vehicle (AUV) for recording seismic signals during a marine seismic survey. The method includes launching the AUV in water, the AUV having a body having a base and sides; guiding the AUV with a propulsion system to a final target on the ocean bottom; activating a pump-jet connected to an inlet and plural base outlets, wherein the plural base outlets are distributed on the base, to bury the AUV when water jets expelled at the plural base outlets fluidize the ocean bottom underneath the base; and recording with a seismic sensor the seismic signals.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV having one or more seismic sensors. However, the embodiments to be discussed next are not limited to AUVs, but may be applied to other platforms (e.g., glider, buoy, node etc.) that may carry seismic sensors. Note that an AUV may encompass a traditional seismic node that has a propulsion system and can autonomously travel from one point to another.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and recovering seismic receivers at the ocean bottom. According to an exemplary embodiment, such a seismic system includes plural AUVs, each having one or more seismic sensors. The seismic sensors may be one of a hydrophone, geophone, accelerometers, electromagnetic sensors, etc. If an electromagnetic sensor is used, then a source that emits electromagnetic waves may be used instead of or in addition to an acoustic source.

The AUV may be a specially designed device or an off-the-shelf device so that it is inexpensive. The off-the-shelf device may be quickly retrofitted or modified to include the seismic sensors and necessary communications means to be discussed later. The AUV may include, besides or in addition to a propulsion system, a buoyancy system. The buoyancy system may be a multi-phase system as discussed later. A deployment vessel may store and launch the AUVs as necessary for the seismic survey. Alternatively, a remotely operated vehicle or other underwater vehicle may store the AUVs and launch them. The AUVs find their target positions using, for example, an inertial navigation system, or another means. Thus, the AUVs may be preprogrammed or partially programmed to find their target positions. If an AUV is partially programmed, the final detail for finding the target position may be received, e.g., acoustically, from the vessel when the AUV is launched from the vessel and/or while the AUV is navigating underwater. In the following, reference is made to a deployment vessel and/or a recovery vessel. Note that these vessels may be identical from an equipment point of view. However, the vessels may be operated as a recovery vessel or as a deployment vessel. In other words, a recovery vessel may be instructed, after having enough AUVs on board, to become a deployment vessel, and vice versa. When the document refers to a vessel, it might be the recovery vessel, the launching vessel or both of them.

As the deployment vessel is launching the AUVs, a shooting vessel may follow the deployment vessel for generating seismic waves. The shooting vessel may tow one or more seismic source arrays. The seismic source array may include plural individual seismic sources that may be arranged on a horizontal line, slanted line or curved line underwater. The individual seismic source may be an air gun, a vibrational source or other known seismic sources. The shooting vessel or another vessel, e.g., the recovery vessel, may then instruct selected AUVs to resurface so they can be collected. In one embodiment, the deployment vessel also tows source arrays and shoots them as it deploys the AUVs. In still another exemplary embodiment, only the deployment vessel is configured to retrieve the AUVs. However, it is possible that only the shooting vessel is configured to retrieve the AUVs. Alternatively, a dedicated recovery vessel may wake up the AUVs and instruct them to return to the surface for recovery.

In one exemplary embodiment, the AUVs number in the thousands. Thus, the deployment vessel is configured to hold all of them at the beginning of the survey and then to launch them as the survey advances. If the shooting vessel is configured to retrieve the AUVs, when the number of available AUVs at the deployment vessel falls below a predetermined threshold, the shooting vessel and the deployment vessel are instructed to switch positions in mid-survey. If a dedicated recovery vessel is used to recover the AUVs, then the deployment vessel is configured to switch positions with the recovery vessel when the deployment vessel becomes empty. In another exemplary embodiment, both vessels are full of AUVs. The first one starts deploying the AUVs, and the second one just follows the first one. Once the first one has deployed most or all of the AUVs, this vessel becomes the recovery vessel and the second one starts deploying AUVs, thus becoming the deployment vessel. Later, the two vessels may switch functions as necessary.

In an exemplary embodiment, the seismic survey is performed as a combination of AUV seismic sensors and streamer seismic sensors towed by the deployment vessel, the shooting vessel or both of them.

In still another exemplary embodiment, when selected AUVs are instructed to surface, they may be programmed to go to a desired rendezvous point where they will be collected by the shooting vessel, the deployment vessel or the recovery vessel. The selected AUVs may belong to a given row or column if a row and column arrangement is used. The shooting and/or deployment or recovery vessel may be configured to send acoustic signals to the returning AUVs to guide them to the desired position. The AUVs may be configured to rise to a given altitude, execute the return path at that altitude, and then surface for recovery. In one exemplary embodiment, the AUVs are configured to communicate among themselves so they follow each other back to the recovery vessel, or they communicate among themselves to establish a queue in which to be retrieved by the shooting, recovery or deployment vessel.

Once on the vessel, the AUVs are checked for problems, their batteries may be recharged or replaced, and the stored seismic data may be transferred to the vessel for processing. Alternatively or in addition, a compressed gas tank may be replaced or recharged for powering the AUV buoyancy system. The recovery vessel may store the AUVs on deck during maintenance or somewhere inside the vessel, e.g., inside a module, closed or open, that is fixed on the vessel or the vessel's deck. A conveyor-type mechanism may be designed to recover the AUVs on one side of the vessel when the vessel is used as a recovery vessel, and to launch the AUVs from the other side of the vessel when the vessel is used for deployment. After maintenance, the AUVs are redeployed as the seismic survey continues. Thus, in one exemplary embodiment the AUVs are continuously deployed and retrieved. In still another exemplary embodiment, the AUVs are configured to not transmit the seismic data to the deployment, recovery or shooting vessel while performing the seismic survey. This may be advantageous when the electrical power available on the AUV is limited. In another exemplary embodiment, each AUV has enough electrical power (stored in the battery) to be deployed only once, record seismic data and resurface for retrieval. Thus, reducing data transmission volume between the AUV and the vessel while the AUV is underwater conserves power and allows the AUV to be retrieved on the vessel before running out of power.

Figure 1:
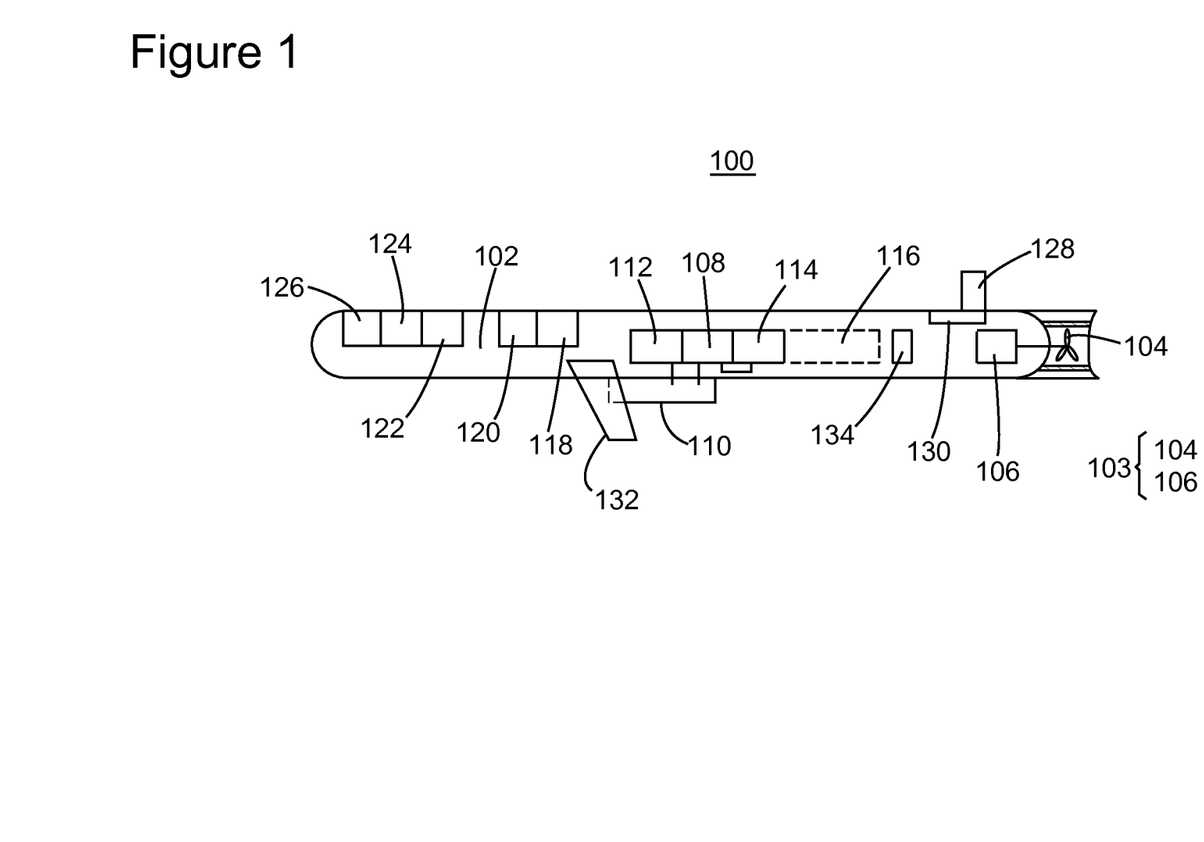
FIG. 1 is a schematic diagram of an AUV.

The above-noted embodiments are now discussed in more detail with regard to the figures. FIG. 1 illustrates an AUV 100 having a body 102 in which a propulsion system 103 may be located. It is noted that in one embodiment, there is no propulsion system. If the propulsion system 103 is available, it may include one or more propellers 104 and a motor 106 for activating the propeller 104. Alternatively, the propulsion system may include adjustable wings for controlling a trajectory of the AUV. The motor 106 may be controlled by a processor 108. The processor 108 may also be connected to a seismic sensor 110. The seismic sensor 110 may have a shape such that when the AUV lands on the seabed, the seismic sensor achieves a good coupling with the seabed sediment. The seismic sensor may include one or more of a hydrophone, geophone, accelerometer, etc. For example, if a 4C (four component) survey is desired, the seismic sensor 110 includes three accelerometers and a hydrophone, i.e., a total of four sensors. Alternatively, the seismic sensor may include three geophones and a hydrophone. Of course, other sensor combinations are possible.

A memory unit 112 may be connected to the processor 108 and/or the seismic sensor 110 for storing seismic data recorded by the seismic sensor 110. A battery 114 may be used to power all these components. The battery 114 may be allowed to change its position along a track 116 to change the AUV's center of gravity.

The AUV may also include an inertial navigation system (INS) 118 configured to guide the AUV to a desired location. An inertial navigation system includes at least a module containing accelerometers, gyroscopes or other motion-sensing devices. The INS is initially provided with the current position and velocity of the AUV from another source, for example, a human operator, a GPS satellite receiver, another INS from the vessel, etc., and thereafter, the INS computes its own updated position and velocity by integrating (and optionally filtrating) information received from its motion sensors. The advantage of an INS is that it requires no external references in order to determine its position, orientation or velocity once it has been initialized. Further, using e an INS is inexpensive.

Besides or instead of the INS 118, the AUV may include a compass 120 and other sensors 122 as, for example, an altimeter for measuring its altitude, a pressure gauge, an interrogator module, etc. The AUV 100 may optionally include an obstacle avoidance system 124 and a communication device 126 (e.g., Wi-Fi or other wireless communication) or other data transfer device capable of wirelessly transferring seismic data. In one embodiment, the transfer of seismic data takes place while the AUV is on the vessel. Also, it is possible that the communication device 126 is a port wire-connected to the vessel to transfer the seismic data. One or more of these elements may be linked to the processor 108. The AUV further includes an antenna 128 (which may be flush with the body of the AUV) and a corresponding acoustic system 130 for communicating with the deploying, recovery or shooting vessel. Stabilizing fins and/or wings 132 for guiding the AUV to the desired position may be used with the propulsion system 103 for steering the AUV. However, in one embodiment, the AUV has no fins or wings. The AUV may include a buoyancy system 134 for controlling the AUV's depth as will be discussed later.

The acoustic system 130 may be an Ultra-Short Baseline (USBL) system, also sometimes known as Super Short Base Line (SSBL), which uses a method of underwater acoustic positioning. A complete USBL system includes a transceiver mounted on a pole under a vessel, and a transponder/responder on the AUV. A processor is used to calculate a position from the ranges and bearings the transceiver measures. For example, an acoustic pulse is transmitted by the transceiver and detected by the subsea transponder, which replies with its own acoustic pulse. This return pulse is detected by the transceiver on the vessel. The time from transmission of the initial acoustic pulse until the reply is detected is measured by the USBL system and converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less.

Figure 2:
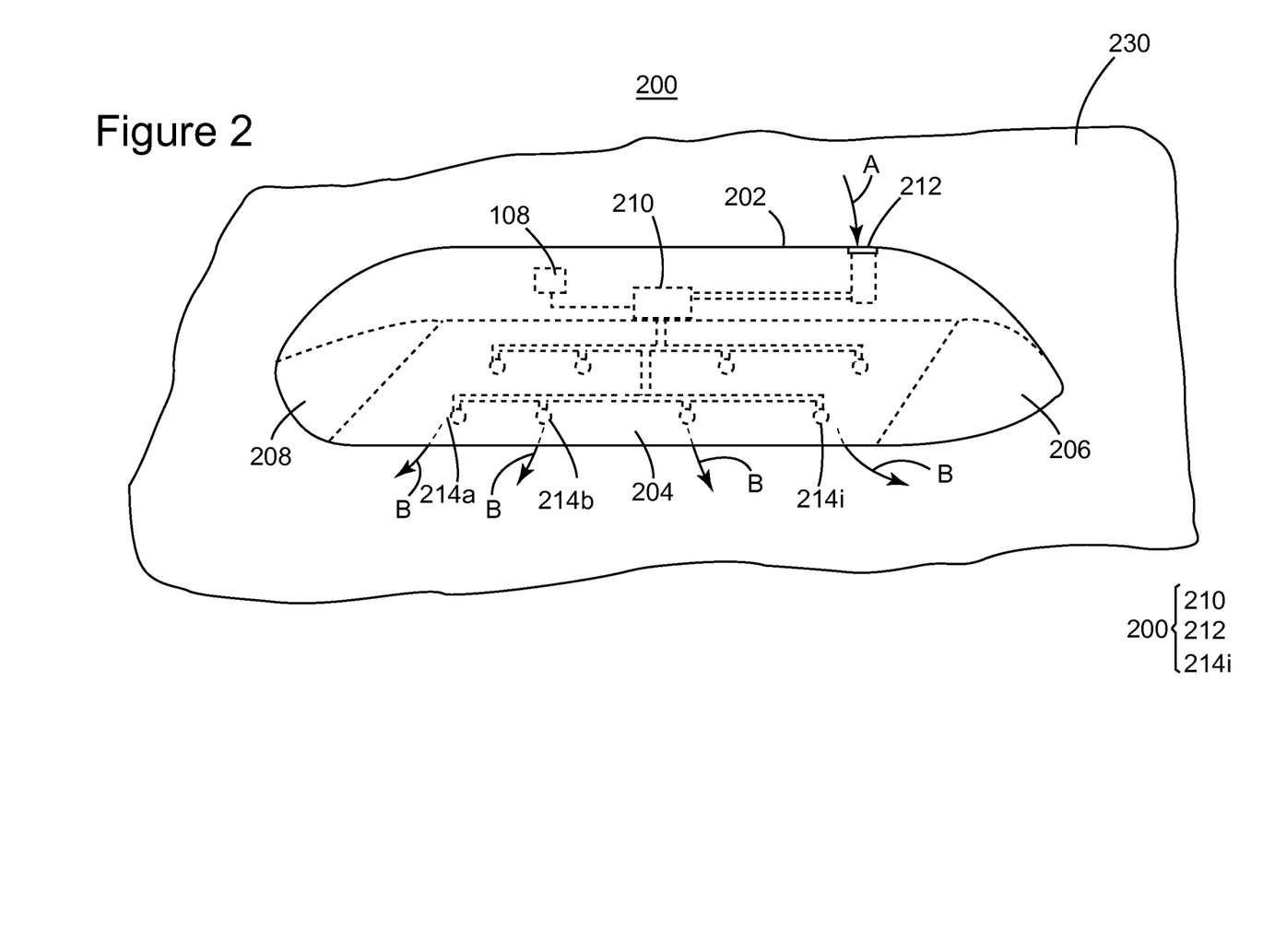
FIGS. 2 and 3 are schematic diagrams illustrating an AUV landed on the ocean bottom and partially burying itself using base outlets according to an exemplary embodiment.

FIG. 2 illustrates an embodiment in which an AUV includes a mechanism for burying at least a portion of itself in the ocean bottom. The inventor has observed that placing a shower head on top of sand and sending water (at a certain speed) through the nozzles of the shower head, the shower head buries itself in the sand. In this experiment, no weight was added to the shower head, only the weight of the shower head was responsible for the vertical force. However, the pressure force on the shower head can be adjusted by adding weight, and thus, the same is true for the AUV. It was observed that injecting water at multi-points underneath the system (for example the AUV) should to be an efficient way for burring it. Some parameters to be taken into account for the burying mechanism are the pressure of the water, the number of injection points, the orientation of the injection points, the vertical force, etc.

According to the exemplary embodiment illustrated in FIG. 2, the AUV 200 has a body 202 (e.g., flush, having any shape, preferably a triangular cross-sectional shape) having a base 204, a nose 206 and a tail 208. The base 204 is illustrated as being flat, i.e., a plane in 2D. However, the base may be round, semi-circular or any other shape. One or more pump jets 210 (or other water pumps) are located inside the body 202 and fluidly communicate with an inlet port 212 and one or more outlet ports 214*i*. In one exemplary embodiment, the value of "i" is between 5 and 60. Other values are possible. Note that each port may have a valve (not shown), controlled by the processor 108, and configured to be opened or closed when necessary, i.e., when needed to bury or detach the AUV. The pump jet is a marine system that creates a jet of water for propulsion. The mechanical arrangement may be, for example, a ducted propeller with nozzle, or a centrifugal pump and nozzle.

Figure 3:
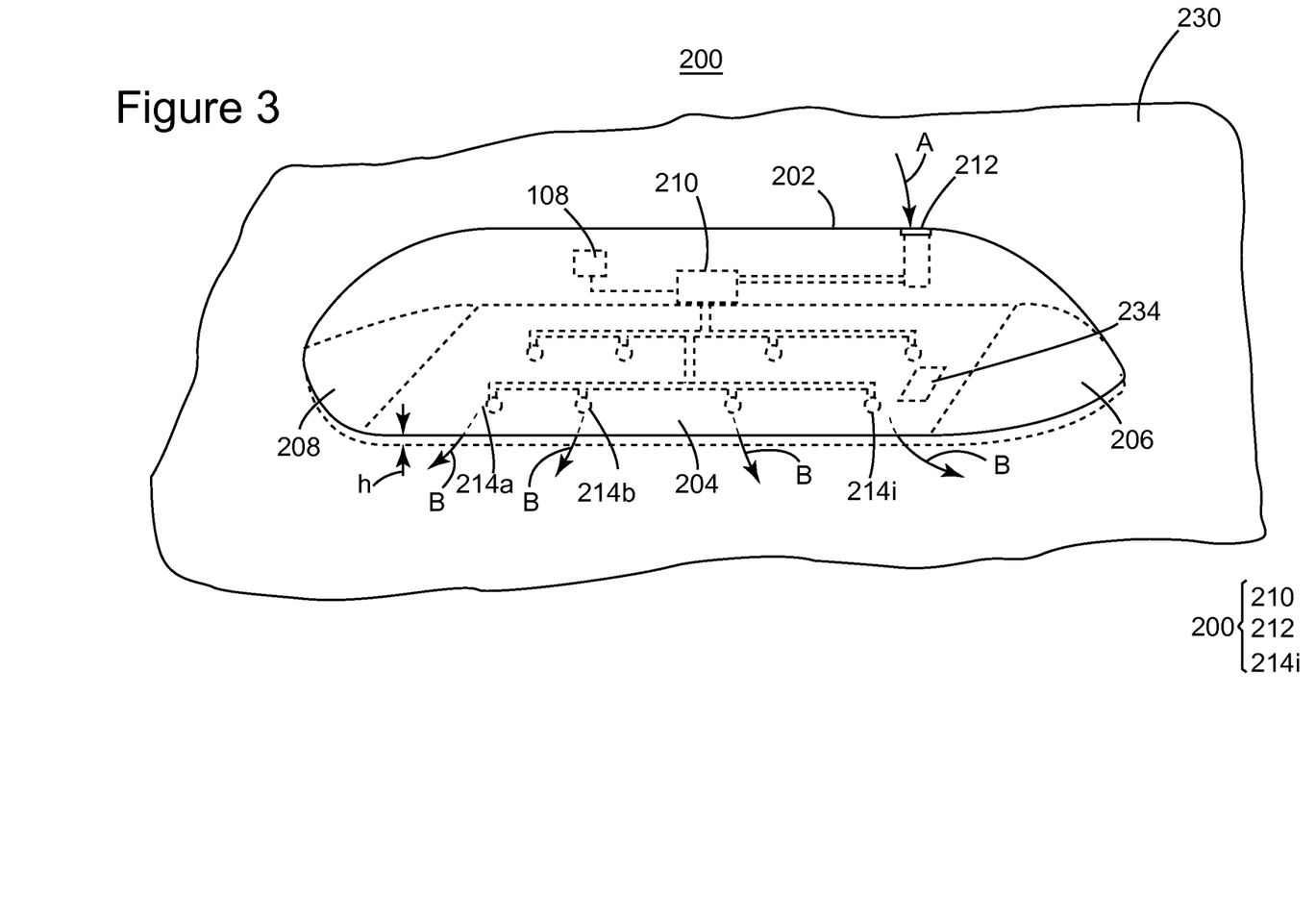

The pump jet may be electrically linked to the processor 108 for coordinating its use. For example, the processor 108 may decide to activate the pump jet only after determining that the AUV has landed. Further, the processor 108 may be programmed to activate the pump jet for a predetermined amount of time, e.g., a second or minutes prior to recording seismic data. The AUV 200 may include one or more of the elements of the AUV 100 discussed with regard to FIG. 1. The pump jet 210 together with the inlet 212 and the plural outlets 214*i* form a burying mechanism 220. The burying mechanism 220 may be used as follows: When the AUV 200 reaches the ocean bottom 230, the processor 108 instructs the pump jet 210 to take in water from the ambient through the inlet 212 and to expel the water at outlets 214*i*. Note that the AUV may have more than one inlet 212. FIG. 2 shows the inlet 212 located on top of the AUV. However, other locations are possible. The water taken in by the pump jet 210 is illustrated by reference A and the expelled water is illustrated by reference B. In this way, the soil (mud) on the ocean bottom in the AUV's immediate vicinity is fluidized and the AUV, due to its weight, starts to bury itself. In this regard, FIG. 3 shows the AUV's base 204 buried up to a depth h in the ocean bottom 230 and, thus, the seismic sensor 234 has a good coupling with the ocean bottom.

Figure 4:
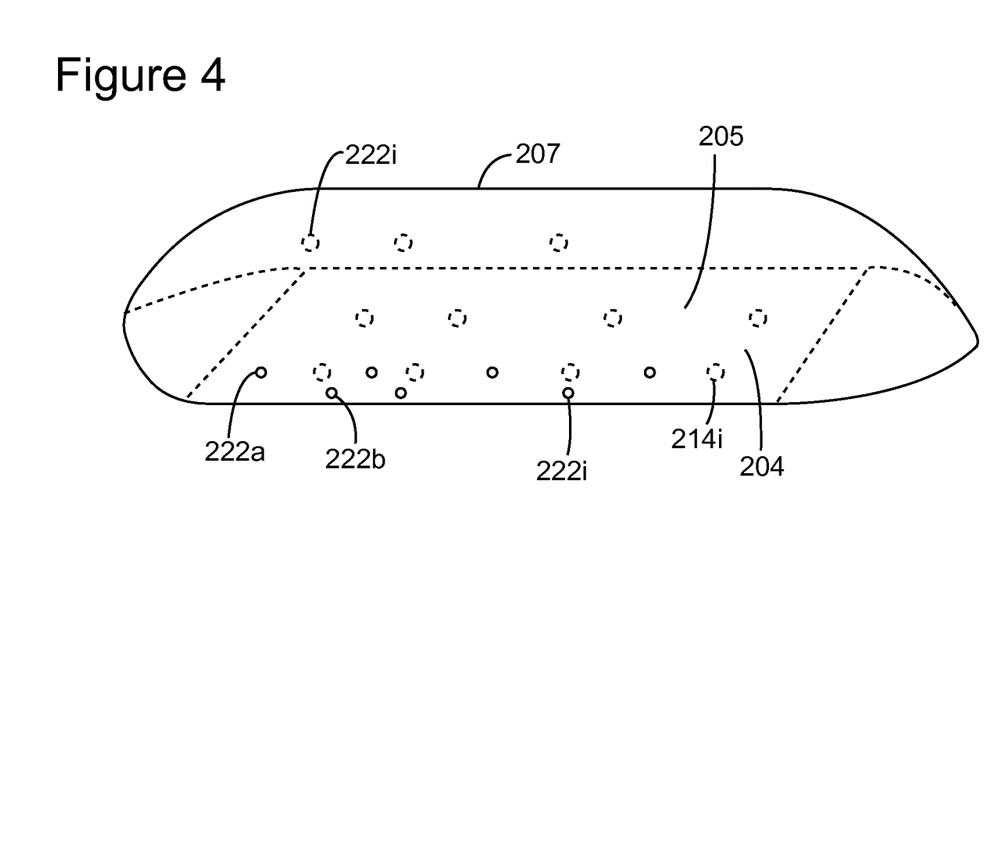
FIG. 4 is a schematic diagram illustrating an AUV having base and side outlets for partially burying the AUV in the ocean bottom according to an exemplary embodiment.

According to another exemplary embodiment, as illustrated in FIG. 4, outlets may be formed not only on the base 204, but also on sides 205 of the AUV. FIG. 4 shows the base outlets 214*i* and the side outlets 222*i*. In one exemplary embodiment, the side outlets 222*i* are formed closer to the base 204 than to the top 207 of the AUV because only the lower part of the sides 205 will be buried in the ocean bottom. Thus, when in use, the pump jet 210 will expel water through both the base outlets 214*i* and the side outlets 222*i* to better bury the AUV.

When the acquisition of seismic data is finished, the burying mechanism 220 may also be used to detach the AUV from the ocean bottom. For this operation, the pump jet expels water through the base outlets 214*i* and/or the side outlets 222*i* with a higher speed than when burying. In other words, the processor 108 may be programmed to achieve a desired water speed, i.e., low speed for burying and high speed for detaching. Optionally, the burying mechanism may be used to slow down the AUV before landing on the ocean bottom.

In one application, the inlet and outlets discussed above are different from the guidance nozzles or other nozzles present on the AUV and will be discussed later. In other words, the burying system 220 is used, according to this embodiment, only for burying and detaching the AUV and for no other function.

Figure 5:
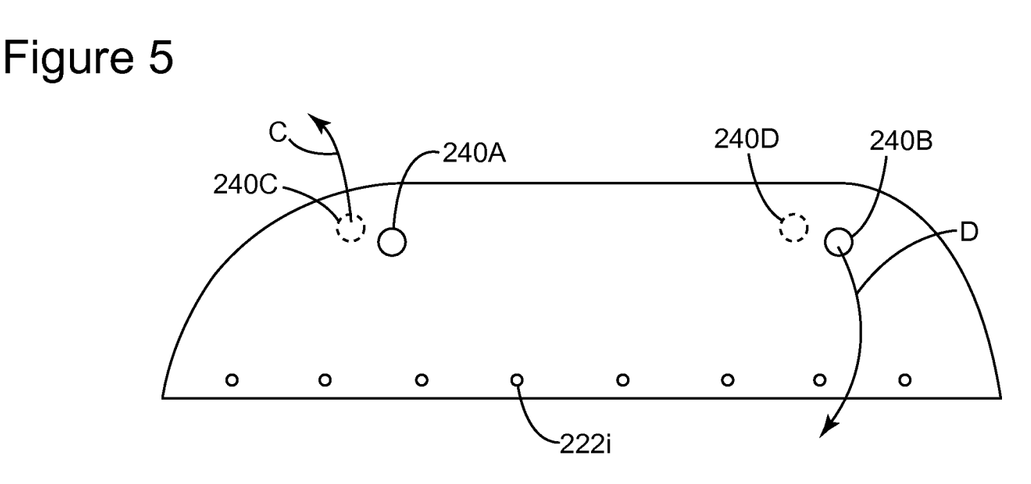
FIG. 5 is a schematic diagram illustrating an AUV having base and side outlets and also vibrating outlets for vibrating the AUV according to an exemplary embodiment.

To enhance the burying function, other (vibrating) nozzles 240A-B provided on the sides of the AUV may also be used to expel water along directions C and D (i.e., one tail nozzle 240C from one side of the AUV and one head nozzle 240B from the other side of the AUV expel the water at the same time to slightly turn the AUV) as illustrated in FIG. 5, to obtain AUV oscillation. In other words, while the base nozzles 214*i* and/or the side nozzles 222*i* fluidize the medium, the other nozzles 240A-B make the AUV shake, to enhance the burying process. Alternatively, the nozzles 240A-B from the same side of the AUV may be actuated and then the corresponding nozzles 240C-D from the other side of the AUV may be actuated to make the AUV oscillate slightly. In one application, the oscillation motion may be achieved while burying is taking place.

Figure 6:
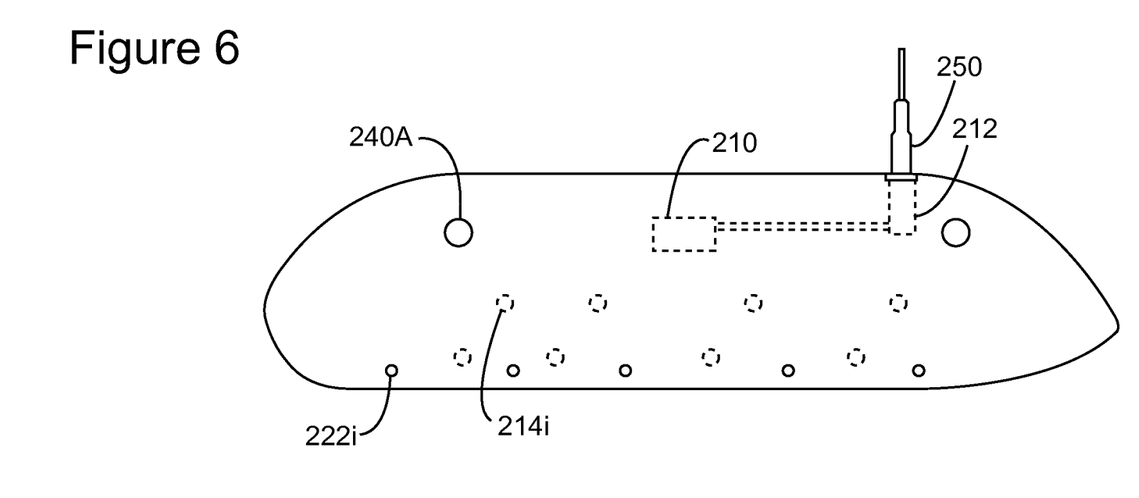
FIG. 6 is a schematic diagram illustrating an AUV having a telescopic conduit connected to an inlet according to an exemplary embodiment.

However, there is the possibility that the ocean bottom is very soft, i.e., muddy, and the AUV burrows into it through inertia. If further burying is desired, mud raised by the AUV's landing may be a problem. In this case, mud floating around the AUV may enter the inlet 212. To prevent this, as illustrated in FIG. 6, a telescopic (conduit) tube 250 may be provided in the inlet 212 so that the tip of the tube 250 may rise above the muddy volume.

With regard to the AUV's shape, it was noted above that one possibility is the shape of a submarine. However, this shape may have various cross-sections, such as circular. In one exemplary embodiment, the AUV's cross-section is nearly a triangle. More specifically, the cross-section may be a triangle with round corners. This triangular-like shape may be advantageous when deploying or recovering the AUV on the vessel. For example, the vessel's launching (and/or recovery) device may have a similar triangular shape and rolling elements configured to rotate such that the AUV is lifted from the water into the vessel or lowered from the vessel into the sea. The rolling elements may be located on the launching device so there is enough contact with the AUV that it does not slip downward when the rolling elements push the AUV upward. Other shapes may be imagined that could be handled by a launching device.

Communication between the AUV and a vessel (deployment, recovery or shooting vessel) may take place based on various technologies, i.e., acoustic waves, electromagnetic waves, etc. According to an exemplary embodiment, an acoustic underwater positioning and navigation (AUPN) system may be used. The AUPN system may be installed on any one of the participating vessels and may communicate with the AUV's acoustic system 130.

The AUPN system may exhibit high accuracy and long-range performance in both positioning and telemetry modes. These features are obtained due to the automatic beam forming transducers, which focuses the sensitivity toward its targets or transponders. This beam can not only be pointed in any direction below the vessel, but also horizontally and even upward to the surface because the transducer is spherical.

Thus, AUPN is a hydro-acoustic Super Short Base Line—SSBL or USBL, tow-tracking system, able to operate in shallow and deepwater areas to proven ranges in excess of 3000 meters. It is a multi-purpose system used for a wide range of applications, including towfish and towed platform tracking, high accuracy subsea positioning and telemetry and scientific research.

The AUPN is used to determine the AUV's position. In one embodiment, the AUV's actual position is measured with the AUPN and then provided to the AUV while moving to its desired position to correct its INS trajectory.

Figure 7:
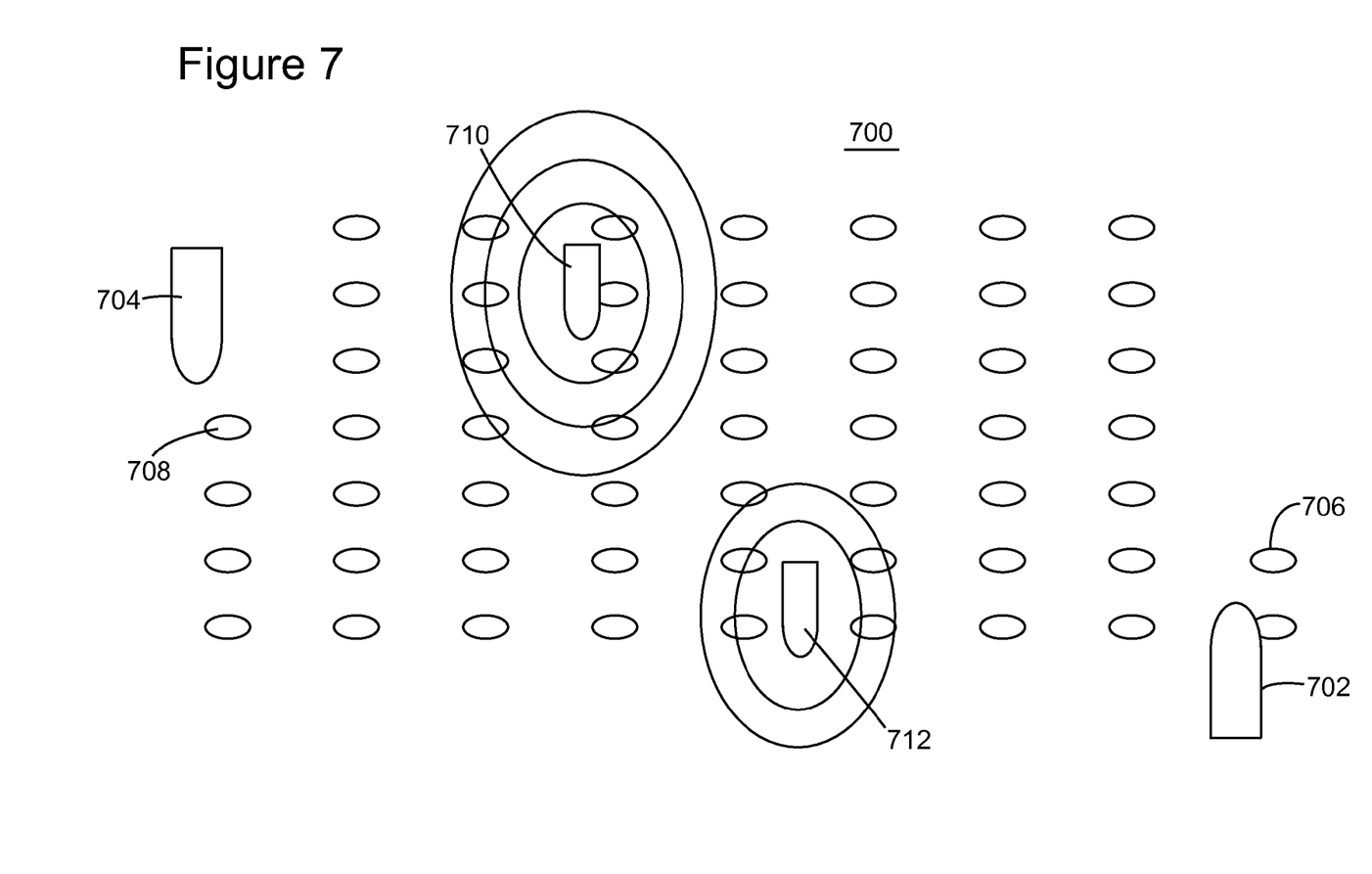
FIG. 7 is a schematic diagram of a system for deploying and recovering AUVs according to an exemplary embodiment.

An embodiment for deploying and retrieving AUVs is now discussed with regard to FIG. 7, which shows a seismic system 700 that includes a deployment vessel 702 and a recovery vessel 704. The deployment vessel 702 is tasked to deploy AUVs 706 while the recovery vessel 704 is tasked to recover AUVs 708. The AUV 706 may be any one of those discussed above. In this embodiment, dedicated shooting vessels 710 and 712 follow their own path and generate acoustic waves. In one application, the deployment and recovery vessels do not tow source arrays. Although FIG. 7 shows two shooting vessels, those skilled in the art would appreciate that one or more than two shooting vessels may be used. In another application, the deployment and recovery vessels operate continuously. When the deployment vessel is empty, it switches positions with the recovery vessel. The shooting of the sources may continue while the deployment and recovery vessels switch positions.

The deploying and recovery processes discussed above are just some examples for illustrating the novel concepts of using AUVs for seismic data recording. Those skilled in the art would appreciate that these processes may be changed, adjusted or modified to fit various needs. For example, instead of deploying and collecting the AUVs from vessels, it is possible to use underwater bases. Underwater bases may be deployed by the vessels and act as a base for the AUVs. Underwater bases may be located on the ocean bottom or they may be suspended from one or more support vessels. Underwater bases are automatized not only to launch and retrieve AUVs, but also to transfer seismic data from the AUVs, charge their batteries, perform quality control actions, etc.

Figure 8:
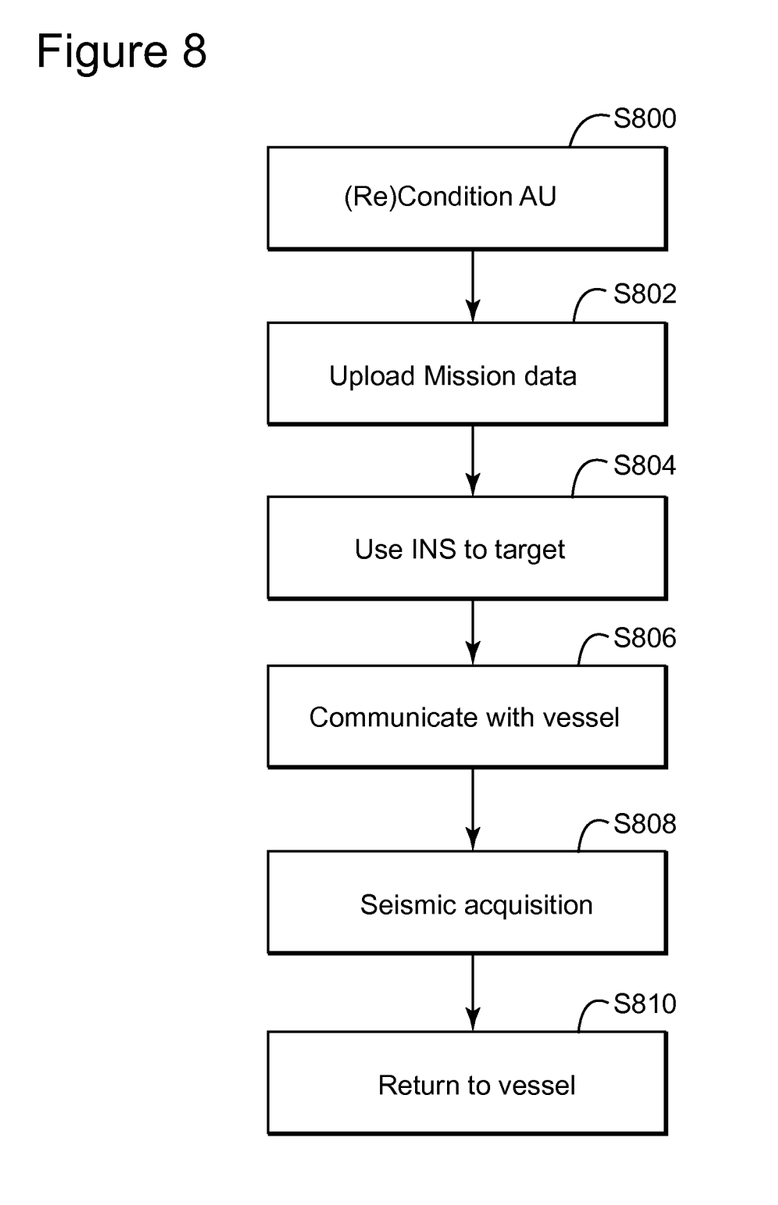
FIG. 8 is a flowchart of a method for recycling AUVs during a seismic survey according to an exemplary embodiment.

A method for deploying and recovering the AUVs is now discussed with regard to the flowchart presented in FIG. 8. In step S800 the AUV is prepared for launching. This preparation phase, i.e., conditioning the AUV if launched for the first time or reconditioning the AUV if recycled, may include one or more of charging the batteries, replacing or recharging the gas tank, downloading seismic data, checking the system, etc.

In the next step S802, the mission data for that specific AUV is loaded in its processor. This step may take place while the AUV is on the deck of the vessel or already loaded in its launching tube or ramp. The mission data may include the AUV's present position, the final desired position on the bottom of the ocean, and other parameters. After this step, the AUV is launched in step S804 (phase one). The AUV is configured to use, for example, its INS (or acoustic communication or INS combined with acoustic communication) and the uploaded mission data to travel (phase two) to its final destination. In one application, the AUV does not receive any information from the vessel while traveling. However, in another application, the AUV may receive additional information from the vessel, for example, its current position as measured by the vessel's AUPN. In still another application, beacons may be used to guide the AUV. In still another application, some of the already deployed AUVs may function as beacons.

In step S806, after the AUV has settled to the seabed (phase three), the vessel interrogates the AUV about its position. The AUV responds by sending a reference beam and the vessel's AUPN determines the AUV's position. The position of the AUV may be determined with an accuracy of, for example, +/−2 m when the AUV is at a depth not greater than 300 m. Alternately, step S806 may be performed between steps S804 and S808, or between steps S808 and S810, or at the beginning of step S810 or both.

After this step, the AUV is ready to record seismic signals in step S808. This process may last as long as necessary. In one application, after the shooting vessel has triggered its source arrays in a predetermined vicinity of the AUV, the AUV is instructed in step S810, for example, using the recovery vessel's AUPN to wake up and start resurfacing (phase four). During this step the AUV activates the gas valves, changes its buoyancy from negative to positive, may start its motor if provided with one, and moves toward the recovery vessel (the AUV can move in the direction of the recovery catcher, but the relative speed will be high, thus, the AUV may also move in the same direction as the boat, but slower, so that the relative speed is more reasonable, and the AUV can actively position itself to be caught by the catcher when the time is proper). In one application, the recovery vessel is the same as the deployment vessel. Acoustic signals emitted by the recovery vessel may also help the AUV arrive at its final target position. Once there, the AUV engages the recovery unit (e.g., chute) of the recovery vessel and the AUV is handled to arrive on the deck of the vessel for reconditioning as described in step S800. The AUV may also be delivered under the deck of the recovery vessel for reconditioning (maintenance) or in a back deck handling module fixed on the deck. Then, the whole process may be repeated so that the AUVs are constantly reused undersea for the seismic survey.

Figure 9:
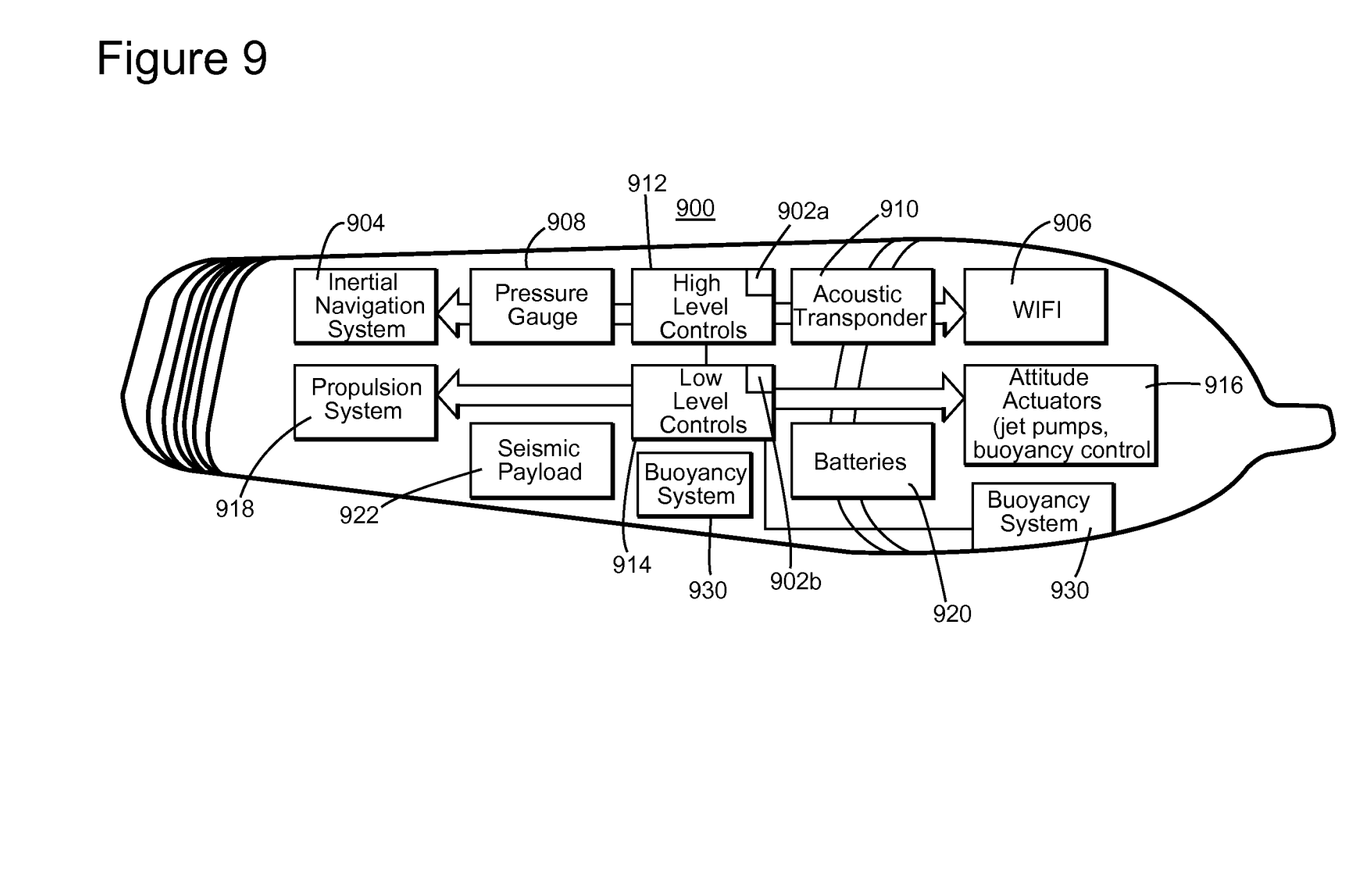
FIG. 9 is a schematic diagram of an AUV according to another exemplary embodiment.

With regard to the internal configuration of the AUV, a possible arrangement is shown in FIG. 9, which shows an AUV 900 having a CPU 902a that is connected to INS 904 (or compass or altitude sensor and acoustic transmitter for receiving acoustic guidance from the mother vessel), wireless interface 906, pressure gauge 908 and transponder 910. The CPU 902a may be located in a high level control block 912. The INS is advantageous when the AUV's trajectory has been changed, for example, by an encounter with an unexpected object, e.g., fish, debris, etc., because the INS is capable of taking the AUV to the desired final position as it does for currents, wave motion, etc. Also, the precision of the INS may be high. For example, it is expected that for a target having a depth of 300 m, the INS is capable of steering the AUV within +/−5 m of the desired target location. However, the INS may be configured to receive data from the vessel to increase its accuracy. Note that the AUV 900 may reach a depth of 300 m, for example, using the buoyancy system 930 (similar to the one described in the previous figures). A CPU 902b, in addition to the CPU 902a, is part of a low-level control module 914 configured to control attitude actuators 916 and the propulsion system 918. One or more batteries 920 may be located in the AUV 900. A seismic payload 922 is located inside the AUV for recording the seismic signals. Those skilled in the art would appreciate that more modules may be added to the AUV. For example, if a sensor is outside the AUV's body, a skirt may be provided around or next to the sensor. A water pump may pump water from the skirt to achieve suction so that a good coupling between the sensor and the seabed is achieved. However, there are embodiments where no coupling with the seabed is desired. For those embodiments, no skirt is used.

Figure 10:
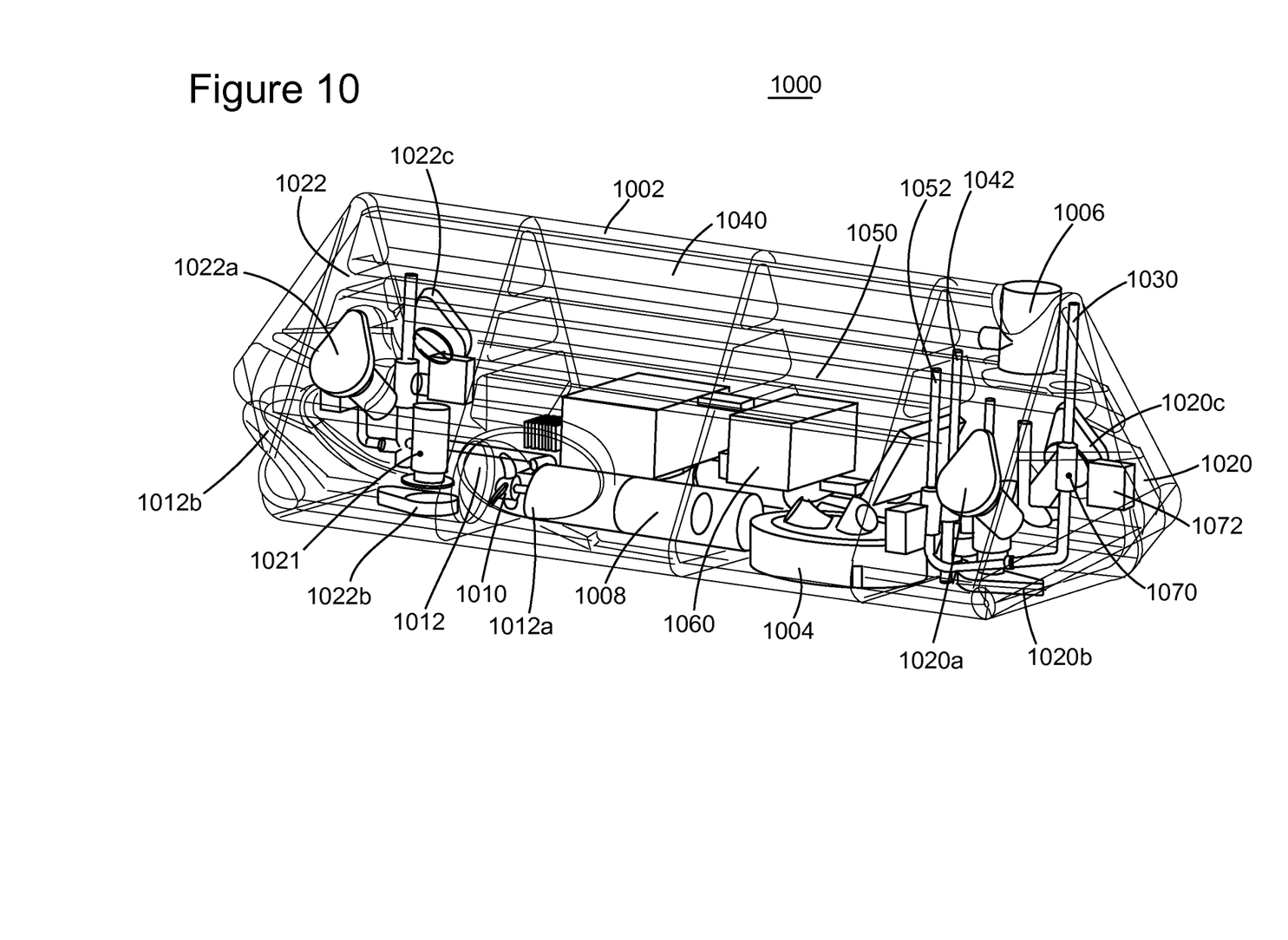
FIG. 10 is a schematic diagram of an AUV according to still another exemplary embodiment.

According to an exemplary embodiment, an AUV having a buoyancy system that includes two chambers that may be flooded is shown in FIG. 10. The AUV 1100 has a body 1102 with a triangular-like shape. The body may be shaped differently. The body 1102 includes a payload 1104 (e.g., seismic sensors as discussed above) and an acoustic transceiver 1106 that may partially extend outside the body 1102. The acoustic transceiver 1106 is configured to communicate with the vessel and receive acoustic guidance while traveling toward a desired target point. Alternatively, an INS may be used for guidance. Many of the devices discussed in the above embodiments may be present in the body but are neither shown nor discussed with regard to this figure for simplicity.

FIG. 10 also shows a motor 1008 configured to rotate a propeller 1010 for providing thrust to the AUV 1000. One or more motors and corresponding propellers may be used. The propeller 1010 receives water through a channel 1012 formed in the body 1002. The channel 1012 has two openings 1012a (intake water element) and 1012b (propulsion nozzle) that communicate with the ambient water. The two openings may be located on the nose, tail or sides of the body 1002.

Guidance nozzles or turbines may be provided at a nose 1020 and/or at a tail 1022 of the body 1002 for rotation and/or translation control. For simplicity, the guidance nozzles and the turbines are identified by the same reference numbers and are used interchangeably herein, although FIG. 10 shows actual turbines. Three guidance nozzles 1020a-c may be located at the nose 1020 and three guidance nozzles 1022a-c may be located at the tail 1022 of the body 1002. The nozzles are connected by piping to corresponding water pumps 1021. If turbines are used instead of nozzles, no piping and no water pumps are necessary. These water pumps may be used to take in water through various vents (not shown) and guide the water thorough one or more of the guidance nozzles at desired speeds. Alternatively, the water pumps may take in the water at one guidance nozzle and expel the water at the other nozzle or nozzles. Thus, according to this exemplary embodiment, the AUV has the capability to adjust the position of its nose with the guidance nozzles (or turbines) 1020a-c and the position of its tail with the guidance nozzles (or turbines) 1022a-c. However, in other embodiments, only the tail nozzles or only the nose nozzles may be implemented. The nozzles discussed above are different from the base nozzles 214i and the side nozzles 222i discussed in the previous embodiments. However, in one application, the guidance nozzles 1020a-c may correspond to the nozzles 240A-D shown in FIG. 5.

FIG. 10 also shows chambers 1040 and 1050 that communicate through piping 1042 and 1052 and vents 1030 with the ambient water so that the chambers may be flooded when desired. A control unit 1060 may instruct the water pump to provide water into one or more of the chambers 1040 and 1050 (to partially or fully flood them) so that the AUV's buoyancy becomes neutral or negative. The same control unit 1060 can instruct the water pump (or use another mechanism) to discharge the water from one or more chambers so that the AUV's buoyancy becomes positive. Alternatively, the control unit 1060 instructs one or more actuators 1070 to fluidly connect the vent 1030 to the flooding chamber for making the AUV's buoyancy negative. For making the buoyancy positive, the control unit 1060 instructs a compressed gas tank 1072 to provide compressed gas (e.g., air, $CO_2$, etc.) to the flooding chambers to expel the water, and then the actuator (e.g., valves) 1070 seals closed the emptied flooding chambers.

Figure 11:
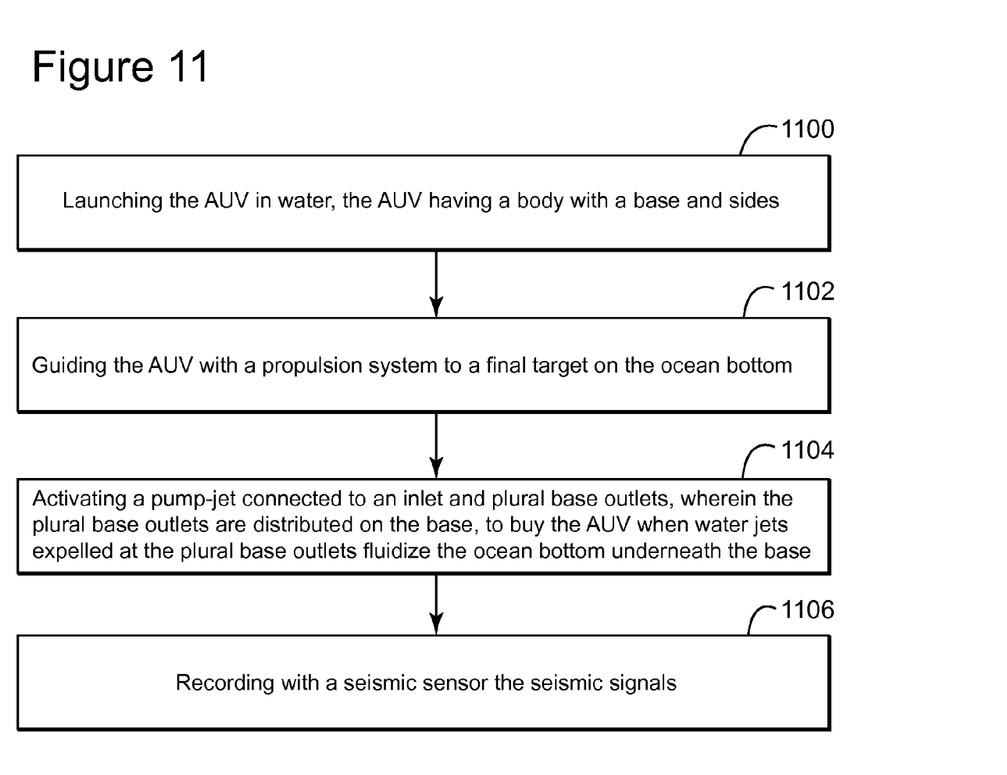
FIG. 11 is a flowchart of a method for partially burying an AUV during a seismic survey.

According to an exemplary embodiment illustrated in FIG. 11, there is a method for partially burying an AUV for recording seismic signals during a marine seismic survey. The method includes a step S1100 of launching the AUV in water, a step S1102 of guiding the AUV with a propulsion system to a final target on the ocean bottom, a step S1104 of activating a pump-jet connected to an inlet and plural base outlets, wherein the plural base outlets are distributed on the base, to bury the AUV when water jets expelled at the plural base outlets fluidize the ocean bottom underneath the base, and a step S1106 of recording with a seismic sensor the seismic signals.

One or more of the exemplary embodiments discussed above disclose an AUV configured to partially bury itself after landing on the ocean bottom and prior to performing seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An autonomous underwater vehicle (AUV) for recording seismic signals during a marine seismic survey, the AUV comprising:
    a body having a base and sides;
    a propulsion system for guiding the AUV to a target on the ocean bottom;
    a pump-jet connected to an inlet and plural base outlets, wherein the plural base outlets are distributed on the base;
    a processor connected to the pump-jet and configured to activate the pump-jet when the base is on the ocean bottom; and
    a seismic sensor configured to record seismic signals while the AUV is buried in the ocean bottom,
    wherein the pump-jet has a first speed so that water jets expelled at the plural base outlets fluidize the ocean bottom underneath the base and buries the AUV.

2. The AUV of claim 1, further comprising:
    plural side outlets distributed on the sides of the body and fluidly connected to the pump-jet so that, when water jets are expelled through the plural side outlets, the AUV is further buried.

3. The AUV of claim 2, wherein the plural side outlets are located closer to the base than a top of the body.

4. The AUV of claim 2, further comprising:
    vibrating nozzles provided on the sides of the body and configured to be activated by the pump-jet or another pump-jet to vibrate the body to further bury the AUV.

5. The AUV of claim 1, wherein the inlet comprises:
    a telescopic conduit configured to extend above the body to provide an intake of clean water.

6. The AUV of claim 1, wherein the inlet is located on top of the body.

7. The AUV of claim 1, wherein the seismic sensor is coupled with the ocean floor after the AUV is buried.

8. The AUV of claim 1, wherein the processor is configured to activate the pump-jet after the AUV has landed and for a predetermined amount of time for burying into the seabed.

9. The AUV of claim 1, wherein the processor is configured to run the pump-jet with a second speed, after recoding the seismic signals, so that the AUV detaches from the ocean bottom.

10. The AUV of claim 1, wherein the processor is configured to run the pump-jet with a second speed just before landing on the ocean bottom to slow down the AUV, wherein the second speed is higher than the first speed.

11. A marine seismic survey system for generating seismic waves and recording seismic signals, the system comprising:
   a source vessel towing a seismic source for generating the seismic waves; and
   plural autonomous underwater vehicles (AUV) for recording the seismic signals,
   wherein an AUV includes,
   a body having a base and sides,
   a propulsion system for guiding the AUV to a target on the ocean bottom,
   a pump-jet connected to an inlet and plural base outlets, wherein the plural base outlets are distributed on the base,
   a processor connected to the pump-jet and configured to activate the pump-jet when the base in on the ocean bottom, and
   a seismic sensor configured to record seismic signals while the AUV is buried in the ocean bottom,
   wherein the pump-jet has a first speed so that water jets expelled at the plural base outlets fluidize the ocean bottom underneath the base and buries the AUV.

12. The system of claim 11, wherein the AUV further comprises:
   plural side outlets distributed on the sides of the body and fluidly connected to the pump-jet so that, when water jets are expelled through the plural side outlets, the AUV is further buried.

13. The system of claim 12, wherein the plural side outlets are located closer to the base than a top of the body.

14. The system of claim 12, wherein the AUV further comprises:
   vibrating nozzles located on the sides of the body and configured to be activated by the pump-jet or another pump-jet to vibrate the body to further bury the AUV.

15. The system of claim 11, wherein the inlet comprises:
   a telescopic conduit configured to extend above the body to provide an intake of clean water.

16. The system of claim 11, wherein the processor is configured to activate the pump-jet after the AUV has landed but prior to recording the seismic signals, and for a predetermined amount of time for burying into the seabed.

17. The system of claim 11, wherein the processor is configured to run the pump-jet, after recording the seismic signals, with a second speed so that the AUV detaches from the ocean bottom.

18. A method for partially burying an autonomous underwater vehicle (AUV) for recording seismic signals during a marine seismic survey, the method comprising:
   launching the AUV in water, the AUV having a body having a base and sides;
   guiding the AUV with a propulsion system to a target on the ocean bottom;
   activating a pump-jet connected to an inlet and plural base outlets, wherein the plural base outlets are distributed on the base, to bury the AUV when water jets expelled at the plural base outlets fluidize the ocean bottom underneath the base; and
   recording with a seismic sensor the seismic signals while the AUV is buried in the ocean bottom.

19. The method of claim 18, further comprising:
   using plural side outlets distributed on the sides of the body and fluidly connected to the pump-jet so that, when water jets are expelled through the plural side outlets, the AUV is further buried.

20. The method of claim 19, further comprising:
   activating vibrating nozzles provided on the sides of the body to vibrate the body to further bury the AUV.

* * * * *